No. 825,480. PATENTED JULY 10, 1906.
P. PATERSON & W. GREGORY.
NOZZLE COUPLING.
APPLICATION FILED NOV. 25, 1905.

Witnesses
Max A. Schmidt
Geo. E. Tew

Inventors
Patrick Paterson
and Walter Gregory.
by Milo B. Stevens & Co.
Attorneys.

UNITED STATES PATENT OFFICE.

PATRICK PATERSON AND WALTER GREGORY, OF CLEVELAND, OHIO.

NOZZLE-COUPLING.

No. 825,480.      Specification of Letters Patent.      Patented July 10, 1906.

Application filed November 25, 1905. Serial No. 289,042.

*To all whom it may concern:*

Be it known that we, PATRICK PATERSON, a citizen of the United States, and WALTER GREGORY, a subject of King Edward VII of England, residing at Cleveland, in the county of Cuyahoga and State of Ohio, have invented new and useful Improvements in Nozzle-Couplings, of which the following is a specification.

This invention is a coupling designed particularly for attaching the nozzle to the end of a hose-pipe.

The object of the invention is to provide a device whereby such attachment can be quickly and easily made and which will clamp the nozzle beyond the possibility of a leak.

The invention is illustrated in the accompanying drawings, in which—

Figure 1:
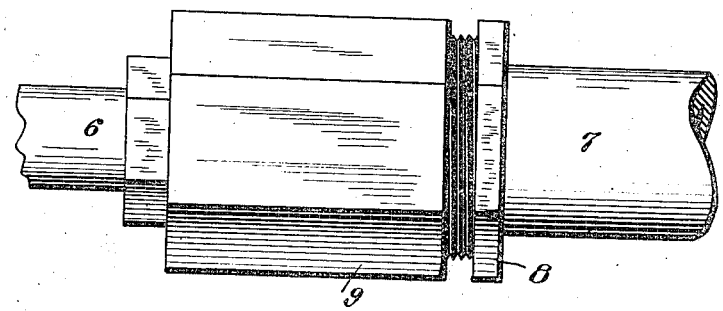
Figure 2:
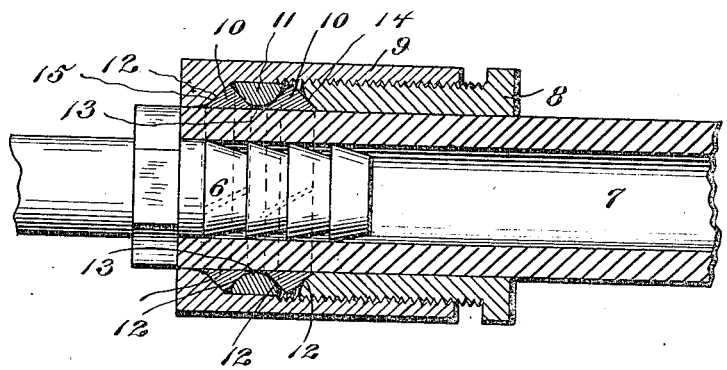

Figure 1 is a plan view thereof. Fig. 2 is a longitudinal section.

Referring specifically to the drawings, 6 indicates the shank of a nozzle, and 7 the end of a hose-pipe in which said shank fits and to which the nozzle is coupled.

A screw-coupling is effected by means of male and female sleeves 8 and 9, the former of which is threaded externally and the latter of which is threaded internally. These sleeves are made square or hexagonal on the outer side, so that a wrench may be applied to tighten or loosen the same.

For the purpose of effecting the clamping action split rings are interposed between the sleeves, comprising two outer or end rings 10 and a middle ring 11 therebetween. The end rings 10 have a double bevel on the outer side, as indicated at 12, and the middle ring has a double bevel on the inner side, as indicated at 13. The inner end of the sleeve 8 is beveled, as at 14, to fit against the corresponding bevel on the ring 10, and the outer sleeve 9 has at the end of its threaded bore a beveled shoulder 15 to fit against the bevel-face 12 of the opposite end ring. When the sleeves are screwed together, the effect is to contract the split rings 10 and to expand the ring 11, which presses the former rings upon the hose and forces the same into tight contact with the shank of the nozzle. The coupling can be readily loosened by unscrewing the sleeve. The use of the plurality of split rings avoids any possibility of leak in consequence of the gap in the ring if only one ring were used.

We claim—

The combination with a hose, and a nozzle-shank fitting within the same, of a pair of members which are sleeved over the hose and screw together and have within the same oppositely-arranged bevels, a pair of double-beveled rings upon the hose between said bevels, and an oppositely-beveled ring between the said rings, arranged to contract the latter when the members are screwed together.

In testimony whereof we have signed our names to this specification in the presence of two subscribing witnesses.

PATRICK PATERSON.
                WALTER GREGORY.

Witnesses:
    JOHN A. BOMMHARDT,
    S. J. BOMMHARDT.